United States Patent
Brennan, III et al.

(10) Patent No.: US 6,741,773 B2
(45) Date of Patent: May 25, 2004

(54) WIDE-BANDWIDTH CHIRPED FIBER BRAGG GRATINGS WITH LOW DELAY RIPPLE AMPLITUDE

(75) Inventors: James F. Brennan, III, Austin, TX (US); Edward Hernadez, Austin, TX (US); John A. Valenti, Round Rock, TX (US); Pranay G. Sinha, Austin, TX (US); Michael R. Matthews, St. Paul, MN (US); Dale E. Elder, Austin, TX (US); Gerald A. Beauchesne, Austin, TX (US); Chad H. Byrd, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 2 days.

(21) Appl. No.: 10/354,800

(22) Filed: Jan. 3, 2003

(65) Prior Publication Data

US 2003/0133659 A1 Jul. 17, 2003

Related U.S. Application Data

(63) Continuation of application No. 09/809,393, filed on Mar. 15, 2001, now Pat. No. 6,577,792.

(51) Int. Cl.$^7$ ................................................. G02B 6/34
(52) U.S. Cl. ......................................... 385/37; 385/122
(58) Field of Search ............................. 385/10, 24, 37, 385/122, 123

(56) References Cited

U.S. PATENT DOCUMENTS 5,718,738 A    2/1998   Kohnke et al.

FOREIGN PATENT DOCUMENTS

| EP | 0 886 153 A | 12/1998 |
|---|---|---|
| EP | 1 030 472 A | 8/2000 |
| WO | WO00/02077 A | 1/2000 |
| WO | WO00/50944 A | 8/2000 |

OTHER PUBLICATIONS

A. Asseh, et al; "A Writting Technique for Long Fiber Bragg Gratings with Complex Reflectivity Profiles", *Journal of Lighwave Technology*(Aug. 1997); vol. 15, No. 8; pp. 1419–1423.

R. KASHYAP, et al; "Infinite Length Grantings", *Bragg Gratings, Photosensitivity, and Poling in Glass Waveguides*, Optical Society of America, Technical Digest (Sept. 23–25, 1999); pp. 38/ThD3–1 –40/ThD3–3.

H. ROURKE, et al; "Fabrication of Extremely Long Fibre Gratings by pahse Matched Concatenation of Multiple Short Sections", *Brag Gratings, Photosensitvity , and Poling in Glass Waveguides*, Optical Society of America, Technical Digest (Sept. 23–25, 1999); pp. 32/ThD1–3.

KOMUKAI, T., et al, "Fabrication of Non–Linearly Chirped Fiber Bragg Gratings for Higher–Order Dispersion Compensation", *Optics Communications*North–Holand Publ. Co., Amsterdam, NL; vol. 154, No. 1–3, AUg. 15, 1998; pp, 5–8.

LOH, W.H., et al, "Dispersion Compensation Over Distance in Excess of 500km for 10–Gb/s Systems Using Chirped Fiber Gratings", *IEEE Phontonics Technology Letters*, vol.8, No. 7, Jul. 1996; pp. 944–946.

GARRETT, L.D.D, et al. "16×10 Gb/s WDM Transmission Over 840–km SMF Using a Slope–Compensating Fiber-Gratings", *IEEE Photonics Technology Letters* , Vol.11, No.4, Apr. 1999; pp. 484–486.

(List continued on next page.)

Primary Examiner—Toan Ton
Assistant Examiner—Michael H. Caley
(74) Attorney, Agent, or Firm—Gregg H. Rosenblatt

(57) ABSTRACT

A device including a chirped Bragg grating, said grating having (a) a reflection bandwidth having a full-width at half maximum that is greater than 6 nm, and (b) a reflection delay ripple amplitude of less than ±50 ps.

18 Claims, 13 Drawing Sheets

OTHER PUBLICATIONS

GNAUCK, A.H., et al. "16×10 Gb/s 400–km WDN Transmission Over NZDSF Using a Slope–Compensating Fiber–Grantings Module", *IEEE Photonics Technology Letters*, vol. 12, No.4, Apr. 2000; pp. 437–439.

FUGII, K., et al, "Broadband Chirped Fiber Bragg Grating for Dispersion Compensator", *European Confernce on Optical Communication*, 26–30 Sept. 1999; Nice, France; pp. I–160—I–161.

IBSEN, M., et al, "Custom Design of long Chirped Bragg Gratings: Application to Gain–Flattening Filter with Incorporated Dispersion Compensation", *IEEE Photonics Technology Letters*, vol. 12, No.5, May 2000; pp. 498–500.

GNAUCK, A.H., et al. "4×40 Gb/s 75–km WDM Transmission Over Convertional Fiber Using a Broad–Band Fiber Grating", *IEEE Photonics Technology Letters*, vol.11 No. 11, Nov. 1999; pp. 1503–1504.

ROCGA, Monica L., et al., "System Impact of the Physical Length of Unapodised Chirped Fiber Bragg Gratings on Dispersion Compersation", *SBMO/IEEE MTT–S IMOC '99 Proceedings* 1999 IEEE; pp. 565–596.

GARRETT, L.D., et al, "Cascaded Cguroed Fuber Gratings for 18–nm–Bandwidth Dispersion Compensation", *IEEE Photonics Technology Letters*, vol.12, No.3, March 2000; pp. 356–358.

IBSEN, Morton, et al, "Long Continunsly Chirped Fibre Bragg Gratings for Compesation of Linear–and 3rd Order–Dispersion", European Conference on Optical Communication, 1997.

LOH, W.H., et al, "10 Gb/s Transmission Over 700 km of Standard Single–Mode Fiber with 10–cm Chirped Fiber Grating Compensator and Duobinary Transmitter", *IEEE Photonics Technology Letters*, vol.8 No.9, Sept. 1996; pp. 1258–1260.

FECED, R., and ZERVAS, M.N., "Effects of Random Phase and Amplitude Errors in Optical Fiber Bragg Gratings", *Journal of Lightwave Technology Letters*, vol. 18, No.1, Jan. 2000; pp. 90–101.

NIEMI, T., et al., "Measurements of Dense Group Relay Ripple Using the Phase Shift Method: Effect of Modulation Frequency", *Conference: Proceedings of Symposium on Optical Fiber Measurements, Sponsor: NIST, IEEE Lasers & Eletro–Opt. Soc*, Opt.Soc.America, 26–28 Sep. 2000; Boulder CO; pp. 165–167.

NIEMI, T., et al, "Limitations of Phase–Shift Method in Measuring Dense Group Delay Ripple of Fiber Bragg Gratings", *IEEE Photonics Technology Letters*, Vol. 13, No. 12, Dec. 2001; pp. 1334–1336.

WIDE-BANDWIDTH CHIRPED FIBER BRAGG GRATINGS WITH LOW DELAY RIPPLE AMPLITUDE

CROSS REFERENCE TO RELATED APPLICATION

This application is a continuation of U.S. Ser. No. 09/809,393, filed Mar. 15, 2001, now U.S. Pat. No. 6,577,792, the disclosure of which is herein incorporated by reference.

FIELD OF THE INVENTION

The present invention relates generally to a device used for chromatically dispersing lightwave signals in fiber optics, and more specifically to a wide-bandwidth chirped fiber Bragg grating that has a low delay ripple amplitude.

BACKGROUND OF THE INVENTION

Modern communication system providers are striving to increase the capacity of their systems to satisfy the rapidly growing exchange of information around the world. Increasing the data rate of a single wavelength channel is one strategy to increase the throughput on optical fibers. However, this approach is limited in that the data rate for a single optical channel will eventually reach practical limitations. An important strategy to further increase the available bandwidth is to add multiple wavelength channels. Multiple wavelength systems are referred to as being wavelength division multiplexed (WDM).

Optical communications systems are available with single-channel data rates at 10 Gbit/s and faster. To accommodate the spectral bandwidth of these signals, the channels in a WDM system are commonly spaced at 100 GHz, or ~0.8 nm in the 1550 nm wavelength range. A device would have to be useful over bandwidths greater than ~0.8 nm to be a truly multi-channel device in these WDM systems. Ideally a device would operate over a full communications band of wavelengths, so systems could be designed for any WDM or modulation scheme without needing to accommodate a specific dispersion correction module. Current communications bands are defined by optical amplifier operating ranges; for instance, the "C" band covers ~1530 nm to ~1560 nm and the "L" band covers ~1570 nm to ~1610 nm.

In these optical communications systems, short pulses of optical energy are sent through optical fibers to transmit information. These optical data pulse are comprised of a spectrum of wavelengths. Generally speaking, an unchirped pulse of duration $\tau$ has a spectral width of $\sim 1/\tau$, e.g., a ~1 nanosecond ($10^{-9}$ second) pulse has a ~1 GHz ($10^9$ Hz) spectral width. As a pulse travels along standard singlemode fiber in the ~1550 nm range, the shorter wavelength components travel faster than the longer-wavelength components. This effect, called chromatic dispersion, broadens the pulse to the point that it eventually interferes with neighboring pulses in a pulse train and introduces errors in the detected data stream. A number of solutions have been proposed for this problem, but only dispersion-compensating fiber (DCF) and chirped fiber gratings have been considered seriously as potential candidates for deployment.

Dispersion-compensating fiber has high levels of dispersion of opposite sign to that of standard fiber. To compensate for the dispersion introduced by an 80-km span of standard fiber, one would have to concatenate a ~16-km length of DCF into the system. These compensation modules are bulky, and due to the fiber design, suffer high optical attenuation and increased optical nonlinear effects. However, DCF is used today since no serious alternative exists.

Fiber Bragg Gratings (FBGs) have emerged as a promising solution for dispersion compensation. An FBG is an optical fiber or other optical waveguide with periodic, aperiodic or pseudo-periodic variations of the refractive index along its length in the light guiding region of the waveguide. Gratings are usually written in optical fiber via the phenomenon of photosensitivity. Photosensitivity is defined as the effect whereby the refractive index of the glass is changed by actinic radiation-induced alterations of the glass structure. The term "actinic radiation" includes visible light, UV, IR radiation and other forms of radiation that induce refractive index changes in the glass. Typically an interferogram of UV radiation is made and then a photosensitive fiber is placed into it. The period of the resulting FBG in the fiber is the period of the interferogram scaled by the waveguides refractive index.

To function as a dispersion compensator, the grating period of an FBG is chirped to reflect lagging wavelengths before faster wavelengths, which must travel further into the grating before they are reflected. An optical circulator is used to separate the input of the device from the output. A dispersion compensating grating (DCG) module recompresses a data pulse that had been corrupted by chromatic dispersion, and optical system performance is enhanced. The longer the grating, the greater the DCG compression factor and the wider the bandwidth of the device.

As a practical matter, long length gratings for dispersion compensation are not available, since extreme tolerances must be maintained to manufacture quality long length gratings. Fabrication errors in chirped gratings create ripples in the group delay curve and thus inaccuracies in the dispersion correction. The impact of these ripples on optical system performance is poorly understood, but some system designers have predicted that these ripples must be less than ~40 ps peak-to-peak for a DCG to be useful as dispersion compensators in most systems. However, the magnitude of the ripple needed to make a useful FBG dispersion correction device has not been verified. A ripple amplitude of ~40 ps peak-to-peak can be caused by a 20% variation in the FBG UV-induced index change, a ~0.3% dimensional change in a fiber core, or a ~4 pm error in grating pitch. Given that the silicon-oxygen inter-atomic spacing in glass is ~160 pm, it has been widely believed that holding these tolerances during grating inscription is not possible, and that fiber fabrication tolerances are limiting the quality of the gratings that they produce.

In 1995, a Swedish research group reported the fabrication of a long-length FBGs by stitching smaller FBGs together. A small grating was written, the fiber was translated by a grating period through a UV-interferogram with a high-precision linear stage, and then the fiber was irradiated again. This process was continued until a grating of the desired length was made. With their system, this group reported it fabricated gratings of up to 50 cm in length. Since this announcement, other groups have extended this work and have reportedly fabricated gratings up to 2.5-m-long. The range of motion of available high-precision staging has limited the length these FBGs.

Several groups have adapted stitching methods to make chirped long length gratings, but stitching errors have caused these gratings to have delay ripple amplitudes that are far too large for use as dispersion compensators in optical communications systems. To implement a stitching technique, one must have precise knowledge of a fiber location relative to the writing interferogram. The accuracy of location measurements is limited by the motion stage encoder—usually interferometer based, which is susceptible to several degradations, such as interpolator inaccuracies, noise in edge detection electronic circuitry, and random fluctuations in received interpolator-laser light.

Several feasibility studies have been completed where long-length FBGs, fabricated by stitching, have been used successfully at specific wavelengths as dispersion compensators in optical communication systems. Since the FBG delay ripple imposed very large distortion-derived system penalties at most wavelengths, the wavelength of the transmitting laser in the communication system had to be adjusted in these studies to obtain reasonable system performance.

A common procedure for determining chromatic dispersion of a device is the modulation-phase shift method, as described in Chapter 12 of Fiber Optic Test and Measurement (ed. D. Derickson, Prentice Hall PTR, NJ, 1998, ISBN #0-13-534330-5). The output of a narrowband, tunable optical source is intensity modulated and applied to the device under test. The transmitted (or reflected) signal is detected and the phase of its modulation is measured relative to the electrical modulation source. The phase measurement is repeated at intervals across the wavelength range of interest. The curve of the relative group delay is constructed by accumulating these group delay changes across the measurement wavelength range.

The group delay ripple is determined by fitting with least squares minimization a line or a low-order polynomial to the relative group delay curve, and then this polynomial is subtracted from the curve. The remainder of the subtraction is the delay ripple. Typically this ripple is considered as being "high frequency" ripple, i.e. ripple with a periodicity of less than the channel bandwidth of a communications system, and "low frequency" ripple, i.e. ripple with a periodicity greater than that of a channel bandwidth. Herein high-frequency ripple will be considered as ripple with a periodicity of less than 80 pm (10 GHz @ ~1550 nm), and low-frequency ripple will be ripple with a periodicity of greater than 80 pm. The high-frequency ripple adds an intra-pulse distortion to a communication signal that is difficult to correct, thus the high-frequency ripple is considered more critical than the low-frequency ripple, which merely adds a slight error to the dispersion correction.

Establishing a correlation between delay ripple amplitude and optical system performance has been confusing because different groups measure DCGs in different manners and, often, are not explicit about their measurement procedures.

Although several studies have demonstrated that DCGs could be used as dispersion compensators for a single communication channel, useful wide bandwidth devices have not been demonstrated, mainly because the delay ripple amplitude of these devices was too large. Widely chirped DCGs with several WDM channels operating across their bandwidth have been demonstrated, but because the wavelength of the transmitting laser in the communication system needs adjustment in all of these studies to obtain reasonable performance, these DCGs proved to have only very narrow sections of usable bandwidth across their entire bandwidth. If a wideband DCG with a large delay ripple is useful only over a very narrow range as a dispersion compensator, then the utility of this widely chirped device is lost. Others have demonstrated DCGs in laboratory systems where DCGs have been used to correct the dispersion in several channels of a communication system, but a DCG that covers only part of a communication band has limited appeal, since the system must be specially engineered to accommodate such a device. Gratings with a bandwidth of at least a third of a communications band (~10 nm) or half a band (~15 nm) have some appeal, since fewer accommodations for the device must be made to use it in a communications system than narrower devices.

Although DCF is used widely today to solve chromatic dispersion problems in high-speed optical communications systems, new DCF designs must attempt to match their dispersion and dispersion slope to be opposite to that of a given transmission fiber. But these DCF designs don't exactly match the dispersion characteristics of their intended fiber and thus leave a residual dispersion that accumulates over multiple spans of transmission fiber. Since DCF designs can be complicated and difficult to manufacture, several transmission fibers do not yet have a matching DCF solution, and some fibers, due to their complex dispersion characteristics, seem unlikely that a perfectly matching DCF design is possible across a wide bandwidth.

There thus exists a need for wide bandwidth (i.e., greater than several WDM channel spacings and preferably a full communications band) fiber Bragg gratings that can compensate for the chromatic dispersion and dispersion-slope in lightwave communications systems across its bandwidth. There also exists a need in the art for a wide-bandwidth chirped fiber Bragg grating that has a low delay ripple amplitude (i.e., <±50 ps). These and other needs are met by the present invention, as hereinafter described.

SUMMARY OF THE INVENTION

In one aspect, the present invention relates to a device used for chromatically dispersing lightwave signals in fiber optics, and to a method for using this device to achieve chromatic dispersion. The device comprises a wide-bandwidth (>0.8 nm) chirped fiber Bragg grating that has a low delay ripple amplitude (<±50 ps). These devices are useful as chromatic dispersion correction devices in high frequency (e.g., 10 Gbit/s) optical communications system. In contrast to previously known devices used for this purpose, these devices do not exhibit large fluctuations in system performance penalty across their bandwidth.

In another aspect, the present invention relates to a method and apparatus for fabricating long length FBGs. In accordance with this aspect of the invention, the fiber being written on is translated with ~1 ppm ($10^{-6}$) velocity control. This is preferably accomplished by placing the fiber into a helical groove on a spool that is mounted to a rotary spindle. The spindle is rotated at a constant velocity, which is preferably regulated by a large flywheel. The groove on the spool acts like a thread on a screw so that, as the spindle turns, a linear stage is used to track the laser beam on the fiber, in a manner analogous to cutting threads on a lathe. Gratings that are tens of meters long can be fabricated with this method.

DETAILED DESCRIPTION OF THE INVENTION

As used herein, the term "reflection delay ripple amplitude" refers to the amplitude measured by subtracting a sixth-order polynomial from the reflection delay curve measured by the modulation-phase shift method and using a frequency of 200 MHz. Herein high-frequency ripple will be considered as ripple with a periodicity of less than 80 pm (10 GHz @ ~1550 nm), and low-frequency ripple will be ripple with a periodicity of greater than 80 pm.

As used herein, the term "full width at half maximum" or "FWHM", when used in reference to a reflection bandwidth, means the range of wavelengths reflected by the device with an amplitude of at least >50% of the maximum reflection amplitude (3 dB points).

In accordance with the present invention, a new FBG fabrication technique is provided that overcomes long-length FBG fabrication limitations. Chirped long-length FBGs can be made in accordance with this technique that exceed 10 m in length. This technique involves a process that translates a fiber at a precise velocity past a stationary interferogram made with a laser beam that is intensity-modulated at frequency $f$. In this method, the fiber is treated as the recording medium of an analog signal, analogous to magnetic tape recording where a magnetic medium is translated at a controlled velocity past a magnetic circuit writing head. The radiation dose $\Phi$ delivered to a fiber along its length $\chi$ as it is translated at velocity v across the laser beam may be expressed as $$\Phi(x) \propto 1 - \frac{1}{2} \cdot \cos\left[2\pi \cdot \frac{f}{v} \cdot x\right].$$

Assuming that the refractive index perturbation induced in the fiber is proportional to the delivered dose of radiation, a grating of period v/f will be written into the fiber. This result is significant, since the methodology allows for the manufacture of a chirped FBG of any length by changing the frequency of the light amplitude modulation or the velocity of the fiber. Complex FBGs can be written into the fiber simply by programming that function into the computer that controls the laser beam modulation.

Past approaches have relied on measuring with extreme accuracy the position of a fiber relative to an interferogram to stitch gratings together. However, the accuracy of location measurements is limited by the motion stage encoder—usually interferometer based—which is susceptible to several degradations, such as interpolator inaccuracies, noise in edge detection electronic circuitry, and random fluctuations in received interpolator-laser light. The advantage of the present technique over previous methods is that it is a velocity-controlled approach that does not require position information for feedback, and thus is not limited by the throw of available high-precision motion staging.

Figure 1:
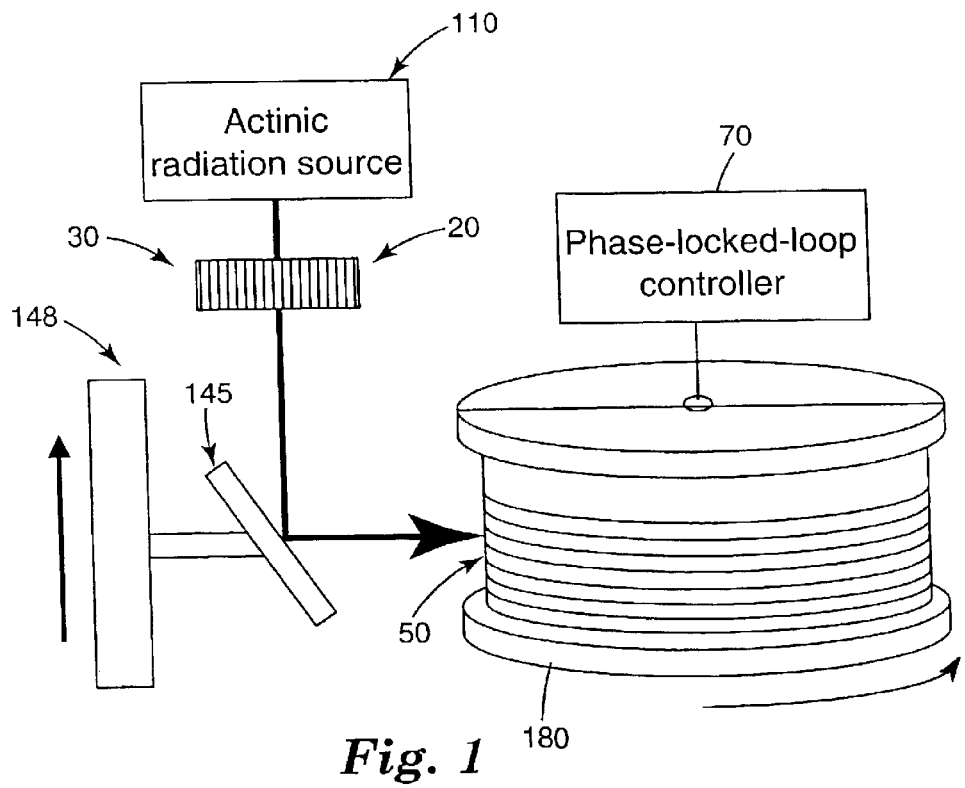
FIG. 1 is a schematic diagram of a long length fiber Bragg grating fabrication system.

To meet the accuracy requirement for fabricating quality DCGs, the fiber should be translated with ~1 ppm ($10^{-6}$) velocity control. This is preferably accomplished by placing the fiber into a helical groove 50 on a spool 180 that is mounted to a rotary spindle, as shown in FIG. 1. The spindle is rotated at a constant velocity, preferably by using a large flywheel to regulate the speed. The groove on the spool acts like a thread on a screw so that, as the spindle turns, a translation motion stage is used to track the laser beam on the fiber in a manner analogous to cutting threads on a lathe. Gratings that are tens of meters long can be fabricated with this method. To meet the tolerances needed to fabricate DCGs, the spool diameters are preferably trued to <10 millionths of an inch (250 nm) precision.

Figure 2:
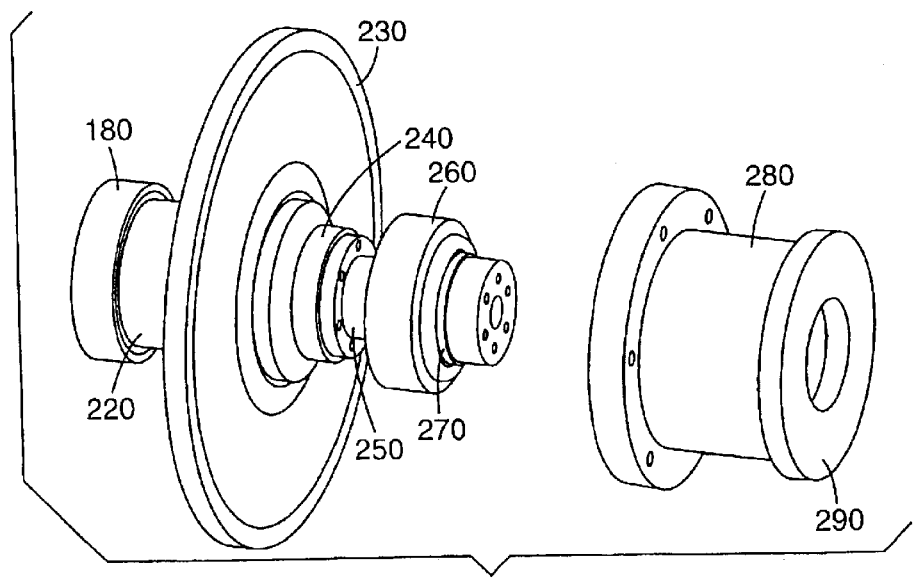
FIG. 2 is a schematic diagram of the motor system used to rotate the helical spool at a constant angular velocity.

A detailed view of the machine used to rotate the spool 180 at a constant angular velocity is shown in FIG. 2. An air bearing 240 is used as the rotational point, which is mounted to an outside fixed housing 280. A flywheel 230 is used to regulate the rotational speed. A mounting chuck 220 attaches the writing spool 180 to the flywheel 230 and the air bearing 240. The spindle system is driven by an induction motor consisting of a stator 260 that is attached to the ouside housing 280 and a rotor made of a high-permeable metal core 250 with a high resistive conductivity metal shell 270 press-fit on it. A rotational encoder 290 is mounted to the housing 280 and the rotor core 250 to provide velocity information to the control electronics.

It has been found that constant velocity can be maintained to a degree that exceeds available position measurements by increasing appropriately the momentum of the motion system to mechanically low-pass filter interpolator errors. It has also been found that the angular momentum of a rotary fabrication system can be increased to reduce the effect of outside disturbances on the fabrication system and produce quality DCGs.

An air-bearing spindle, which exhibits relatively no torque ripple, supports the motor in the fabrication system. Without wishing to be bound by theory, it is believed that turbulence from the air in this spindle (and other vibrations in other support structures) causes errors in the fiber motion and thus compromises the grating quality. The angular momentum L of a symmetrical rigid body may be expressed as L=Iω, where I is the rotational inertia and ω is the angular velocity of the rotating body. By increasing the system rotational speed and by increasing its rotational inertia, chirped FBGs have been fabricated with decreased delay ripple amplitudes. Preferably, the rotational inertia of the system is at least 1 g cm$^2$, more preferably, at least 10 g cm$^2$, and most preferably, at least 100 g cm$^2$.

EXAMPLE 1

This example illustrates the effect of increasing the rotational inertia, and hence the angular momentum, of the spindle used in the DCG fabrication system.

Figure 3A:
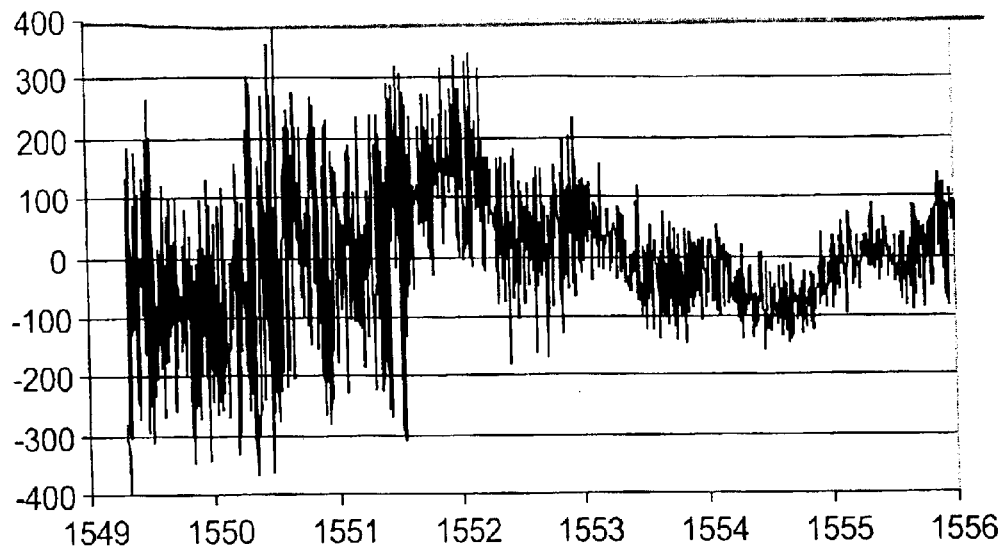
FIGS. 3a and 3b show delay ripple spectra measured from two different gratings fabricated with the system operating at different levels of angular momentum.

Two chirped FBGs were written, and their delay ripple amplitude was analyzed. The fabrication system of the first FBG comprised an induction motor with a smooth-walled rotor supported by an air bearing spindle. The spindle was controlled to rotate at a constant velocity with phase-locked-loop (PLL) electronics that followed a moiré-effect rotary encoder. A spool with a helical groove to hold the optical fiber was also mounted to the air-bearing spindle. A spectrum of the delay ripple is shown in FIG. 3a. The delay ripple amplitude was hundreds of picoseconds. The rotaional inertia of the first system was ~0.5 g cm.

Figure 3B:
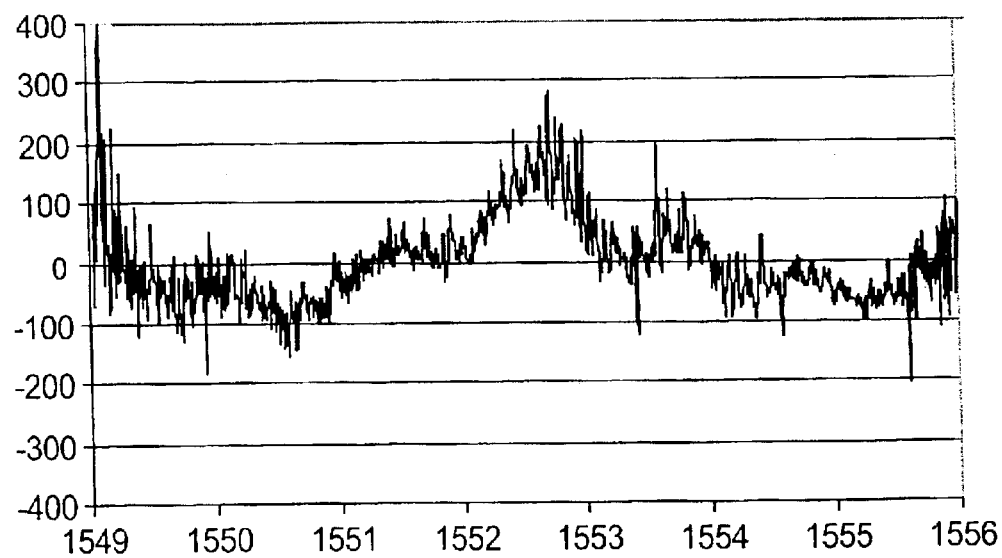

The fabrication of the second gratings was the same as the first, but in this case the rotational inertia of the system was increased 40 times by adding a 40-cm-diameter flywheel to the system. The inertia of the first system was ~220 g cm$^2$. A spectrum of the delay ripple of the second FBG is shown in FIG. 3b. The delay ripple amplitude is substantially reduced from that of the FBG made without the flywheel.

The gross deviation from the baseline with a periodicity of a few nanometers, or very low-frequency ripple, is due to the poor quality of the encoder used in these experiments and is irrelevant for the point of this demonstration.

EXAMPLE 2

Figure 4:
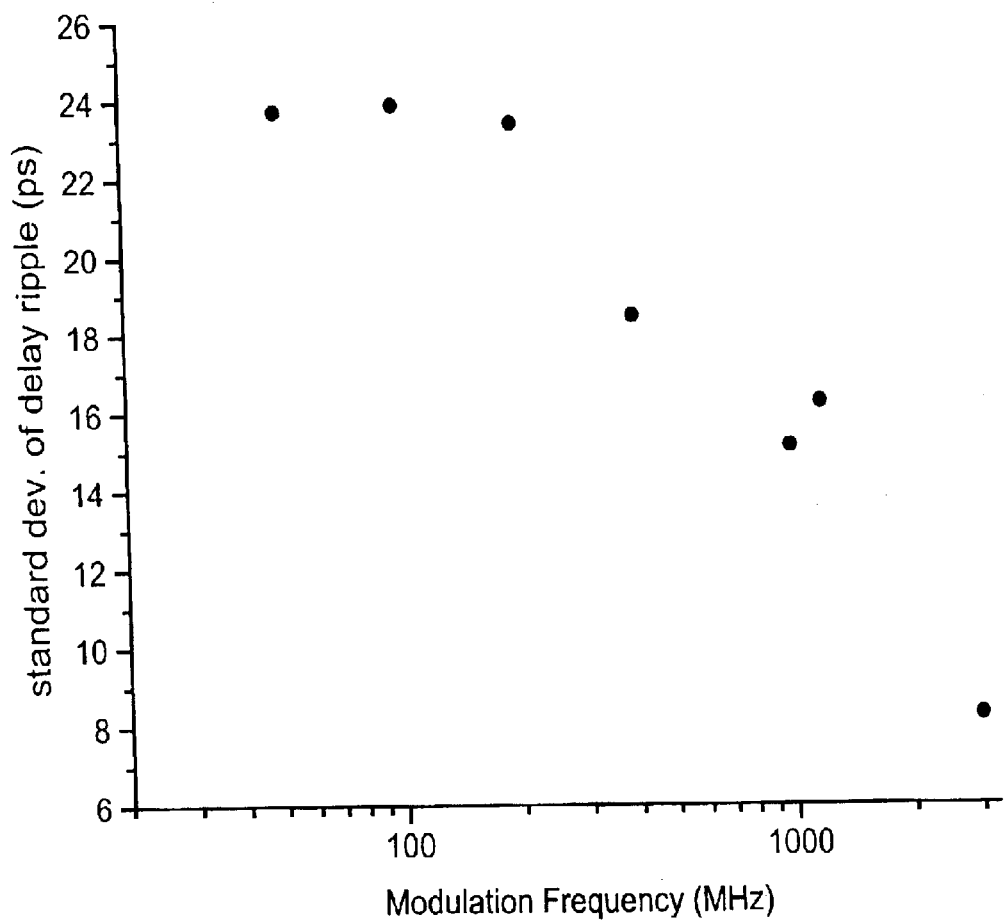
FIG. 4 shows how the measured delay ripple of a grating can vary as a function of the modulation frequency used with the modulation-phase shift measurement method.

A measurement of a DCG delay ripple with the modulation phase-shift method can vary depending on the modulation frequency, as shown in FIG. 4. If the measurement is made at 1 GHz, a ripple with ½ the amplitude of that measured with a 100 MHz signal may be determined. It has been found that measuring the devices with a modulation frequency of <200 MHz gives consistent results. In some cases where the periodicity of the ripple is very fine, a frequency of <50 MHz is needed. For the measurements reported herein, a modulation frequency of 200 MHz was used as a standard.

EXAMPLE 3

This example further illustrates the improvements possible in delay ripple amplitude through the use of increasing the angular momentum of the spindle.

Figure 5:
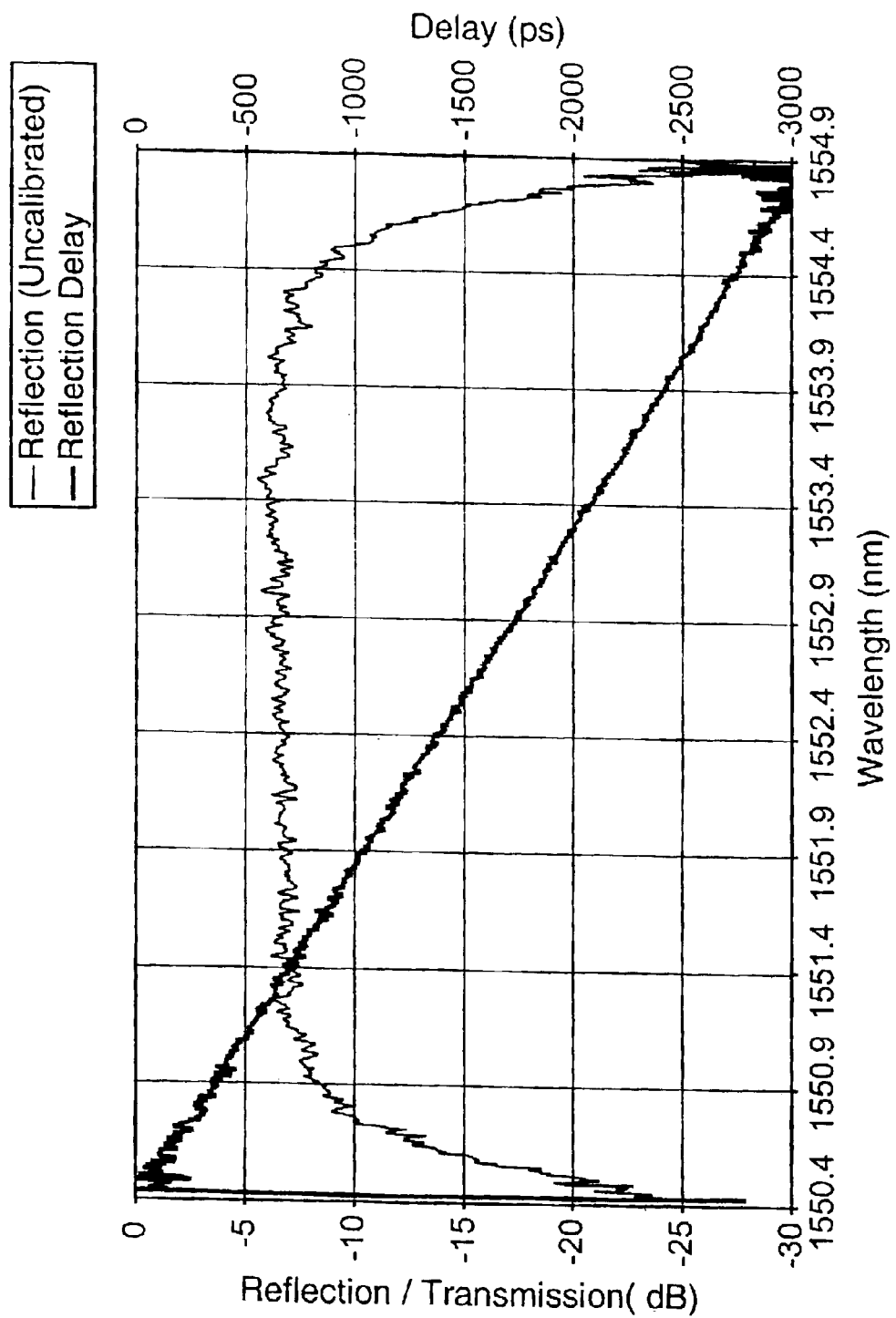
FIG. 5 shows reflection and reflection delay spectra of a high quality chirped long length grating.
Figure 6:
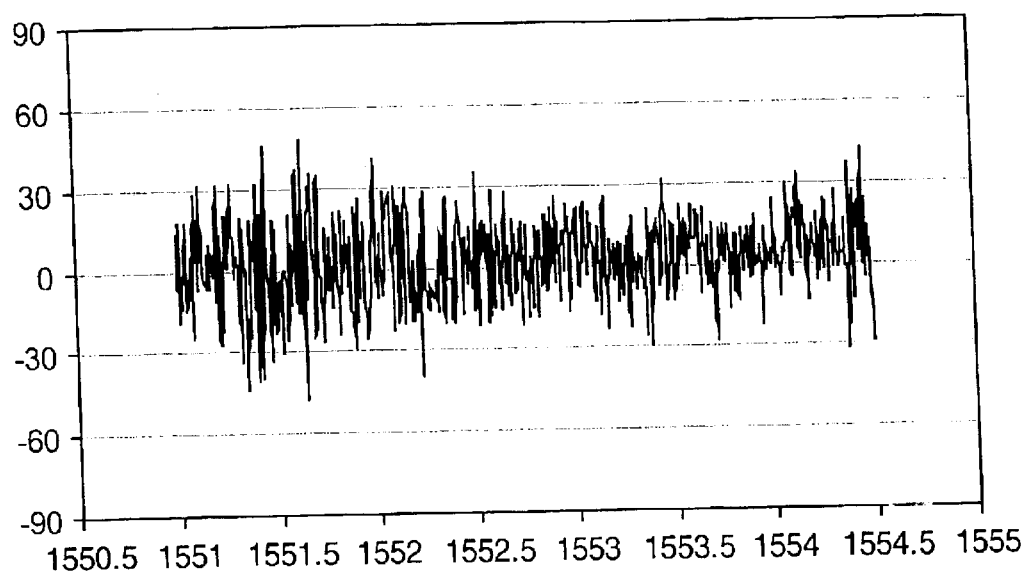
FIG. 6 shows reflection delay ripple spectra of a high quality chirped long length grating.

The fabrication system detailed in Example 1 was further improved by installing a heavier flywheel attached to the system of inertia ~650 g cm$^2$. The gratings were also written at faster rotational speeds to further increase the angular momentum of the fabrication system. The resulting FBGs exhibited delay ripple amplitudes of less than ±30 ps over bandwidths greater than 1 nm. The reflection, delay in reflection, and delay ripple of such a grating is shown in FIGS. 5 & 6.

EXAMPLE 4

Figure 7:
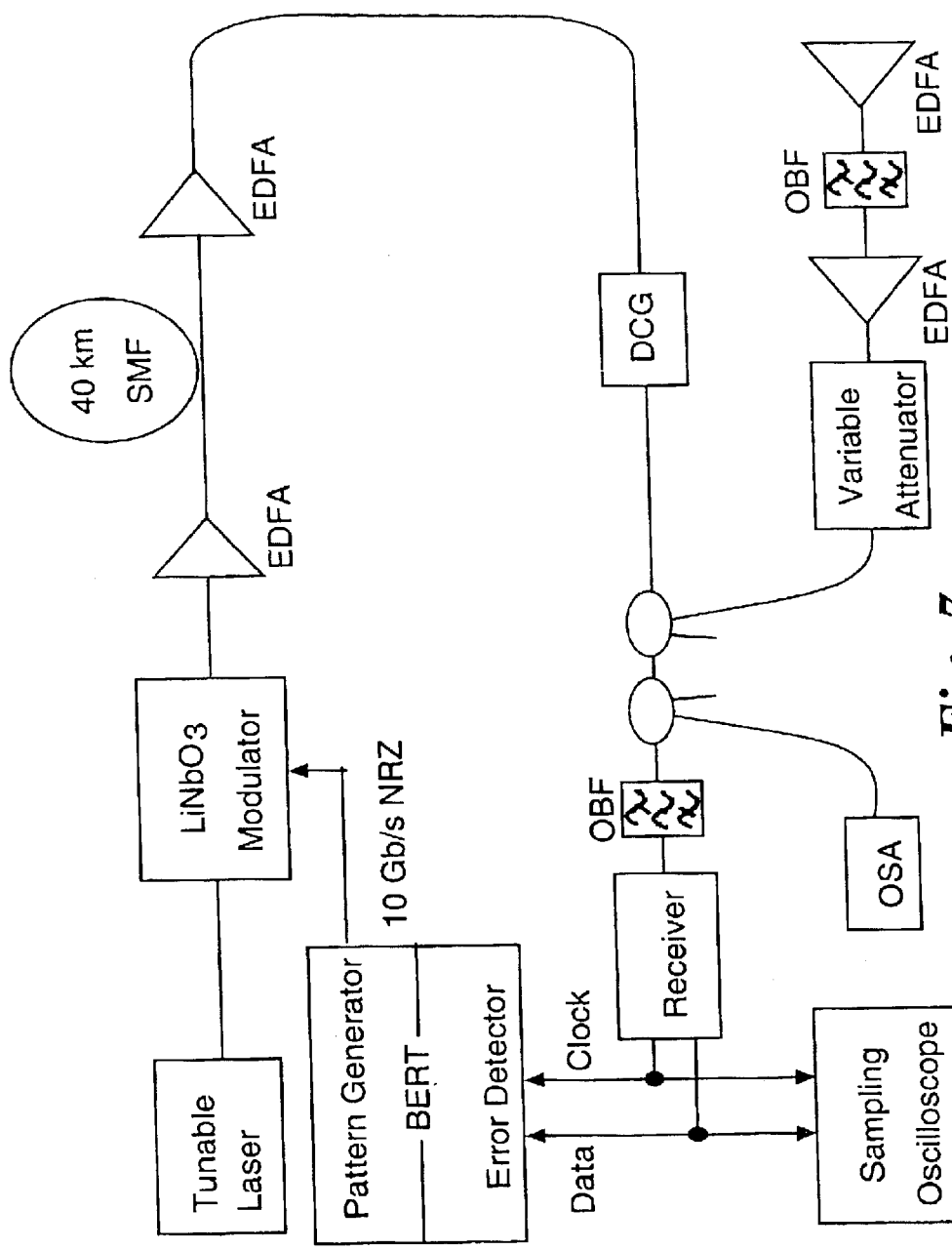
FIG. 7 is a schematic diagram of an optical system.

The performance of the dispersion compensating grating (DCG) was assessed in a system. The tested configuration, which is shown in FIG. 7, consisted of a transmission line of 40 km conventional single mode fiber (SMF) with a nominal dispersion of +17 ps/nm/km. Light from a commercially available tunable laser with tuning capability in steps of 1 pm was modulated with $2^{23}-1$ pseudo-random binary sequence (PRBS) 10 Gb/s nonreturn-to-zero (NRZ) data via a chirp free external LiNbO$_3$ modulator. The 10 Gb/s optical data output from the modulator was amplified by an Er$^+$-doped fiber amplifier (EDFA) and launched into the 40 km SMF transmission line. The launched optical power into the SMF was kept low (~2 dBm) in order to avoid any possible nonlinear effects. After transmission the signal was again amplified by a second EDFA compensating the attenuation in SMF.

DCGs with a dispersion of −680 ps/nm were placed after the second EDFA to compensate the total accumulated dispersion of the transmission line. The dispersion compensated signal was directed to a 10 Gb/s receiver where the optical data was converted into an electrical 10 Gb/s data stream and a clock signal was recovered. A tunable optical bandpass filter of 0.9-nm bandwidth, which followed the source wavelength, was used before the receiver to suppress the ASE noise outside the signal bandwidth, hence improving the receiver performance.

Figure 8:
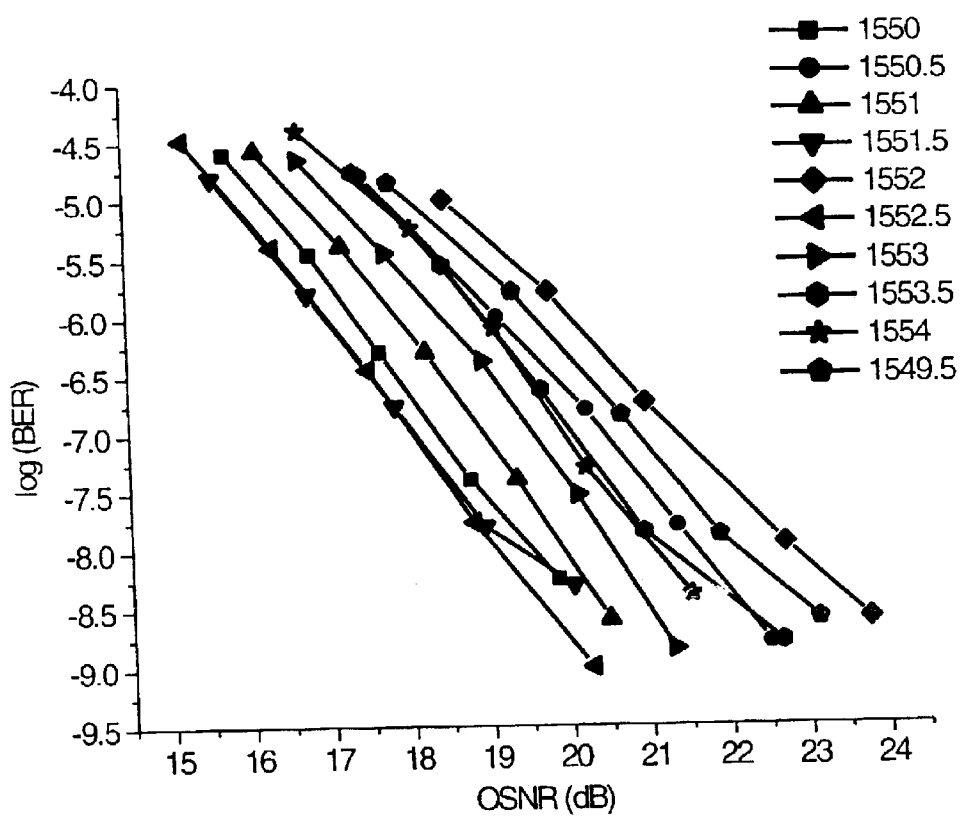
FIG. 8 is a graph that shows the bit-error-rate versus optical signal-to-noise measured in an optical communication system utilizing a low quality fiber Bragg grating as a dispersion compensator.

As an example of a poorly performing DCG, FIG. 8 shows the bit-error-rate (BER) versus optical signal-to-noise ratio (OSNR) where a DCG with ~±50 ps delay ripple amplitude is used as a dispersion compensator in an optical fiber communication system. Notice that as the wavelength of the signal is changed slightly, the BER performance at a given OSNR varies by orders of magnitude, rendering the device useless.

Figure 9:
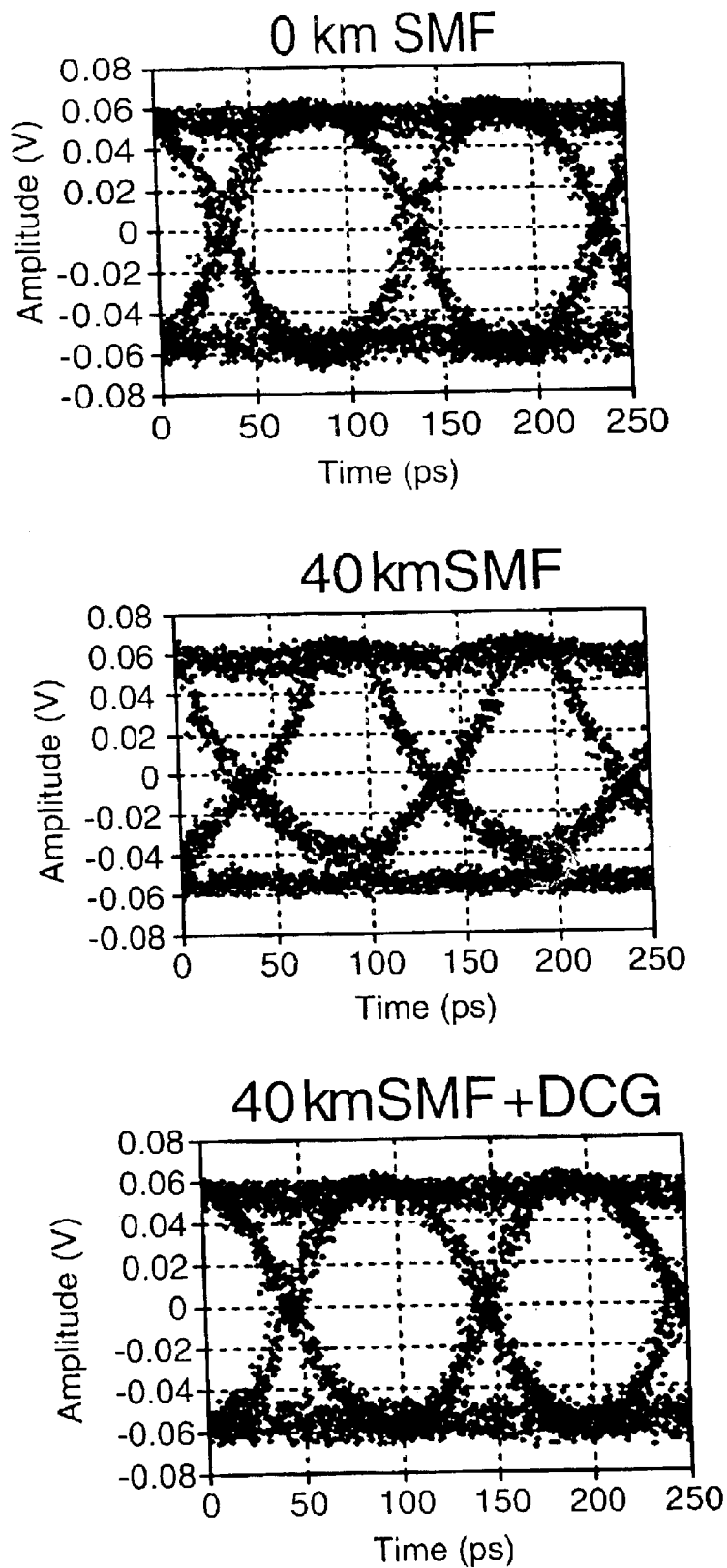
FIG. 9 shows an example eye diagram measured in an optical communication system utilizing a high quality fiber Bragg grating as a dispersion compensator.

In contrast, the DCG illustrated in Example 3 was placed in the system. FIG. 9 shows eye patterns of data signal, recorded with a sampling oscilloscope, at various locations along the transmission line. The dispersion induced eye closure at the end of 40 km of SMF and its complete restoration at the receiver clearly shows the effectiveness of the dispersion compensation by the DCG.

Figure 10:
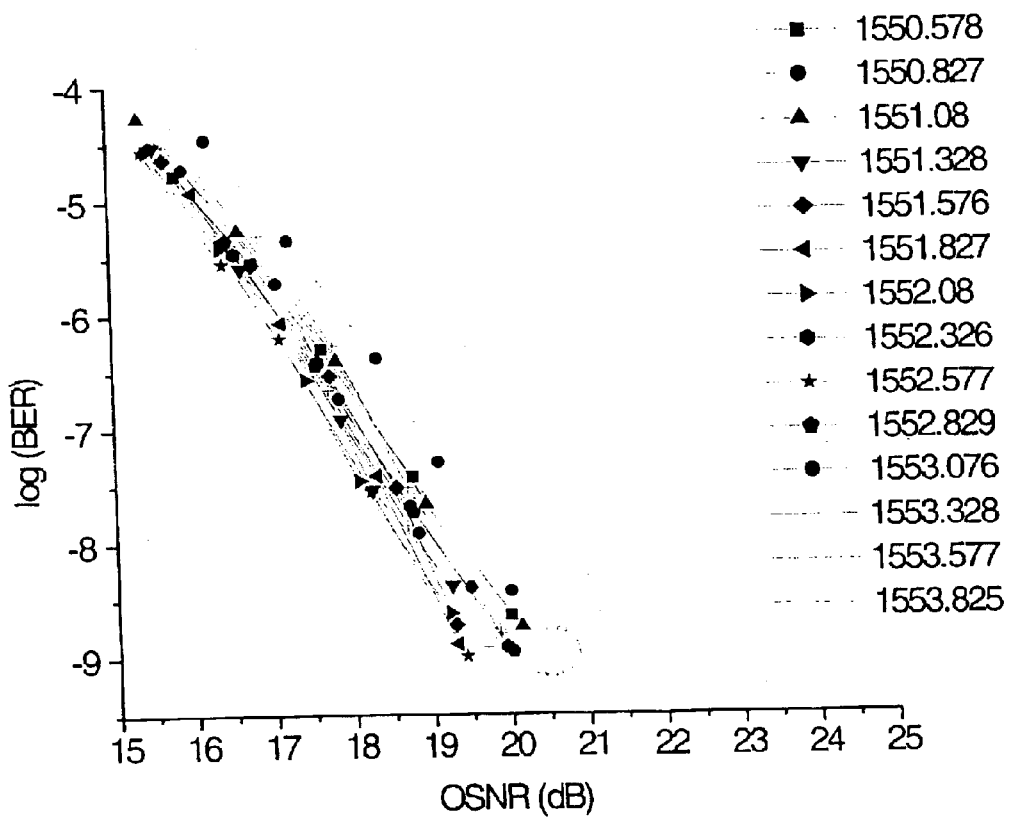
FIG. 10 is a graph that shows the bit-error-rate versus optical signal-to-noise measured in an optical communication system utilizing a high quality fiber Bragg grating as a dispersion compensator.

The uniformity of the DCG performance in the system was examined by measuring bit-error-rate (BER) as a function of optical signal to noise ratio (OSNR) across the DCG bandwidth. The measurement involved adding noise to the transmitted signal after dispersion compensation, effectively varying the OSNR, and measuring the resulting BER using a 10 Gb/s bit-error-rate testset (BERT). The noise source used in the system was ASE noise generated from a combination of two EDFAs. An optical bandpass filter was used to limit the ASE bandwidth of the first EDFA to match the bandwidth of the DCG. The ASE noise after filtering thus behaves as a pump signal to the second EDFA generating a high power ASE noise within the bandwidth of interest. The ASE noise was summed with the transmitted signal through an attenuator, and the OSNR, measured with an optical spectrum analyzer, was varied by varying the attenuator. FIG. 10 shows the results of these measurements. It can be clearly seen that as the source wavelength was changed across the DCG bandwidth the OSNR needed to obtain a given BER varies by <1 dB. No wavelengths were found throughout the DCG bandwidth that did not operate in a similar manner. Eye diagrams and BER tests are commonly used tools to assess a communications systems performance, as described in Chapter 8 of Fiber Optic Test and Measurement (ed. D. Derickson, Prentice Hall PTR, NJ, 1998, ISBN #0-3-534330-5).

EXAMPLE 5

Figure 11:
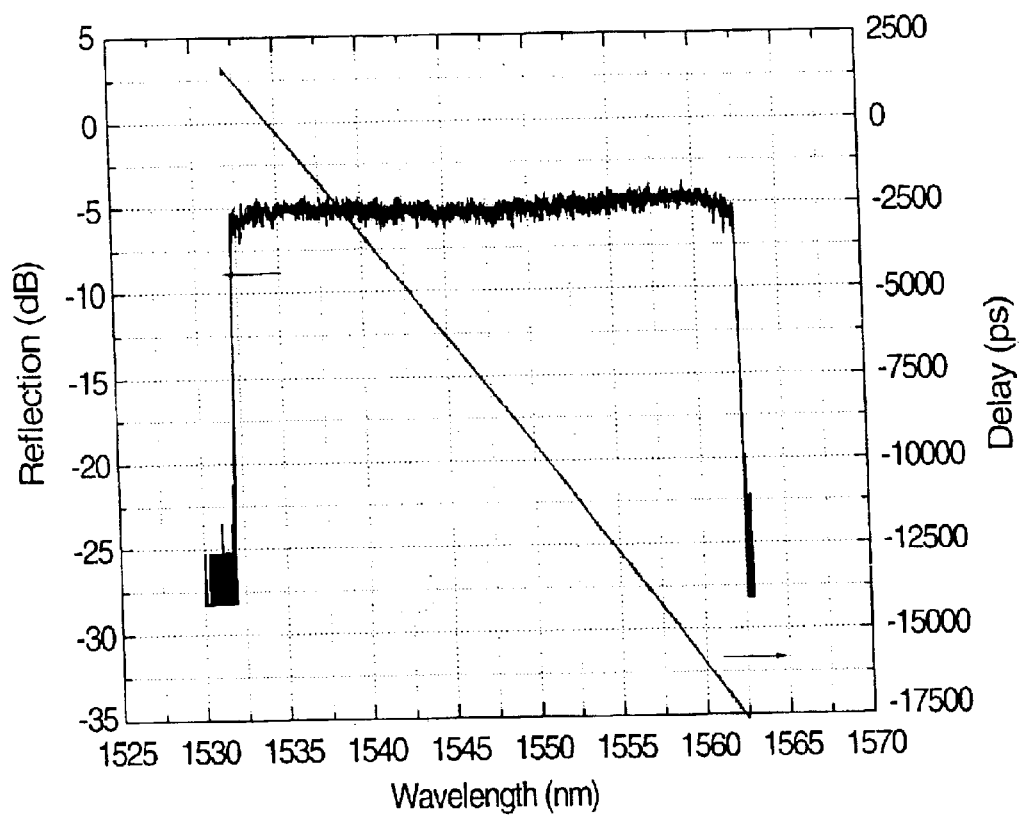
FIG. 11 is a graph that shows reflection delay ripple spectra of a high quality chirped long length grating of ~30 nm bandwidth.
Figure 12:
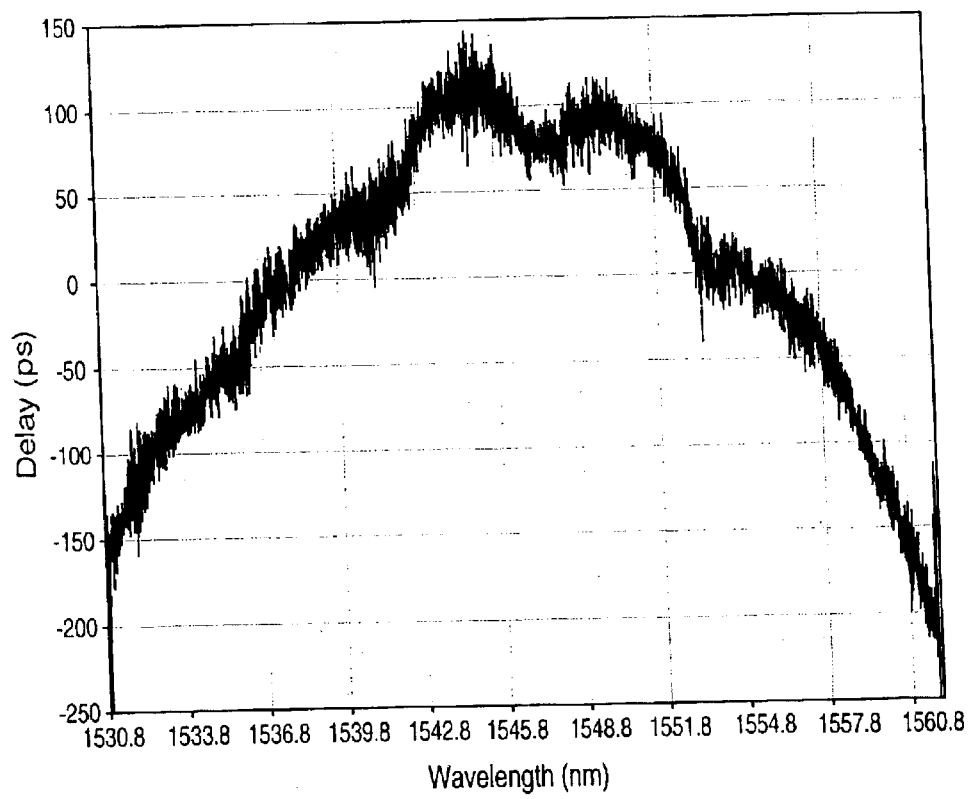
FIG. 12 is a graph that shows the dispersion slope of a high quality chirped long length grating of ~30 nm bandwidth.
Figure 13:
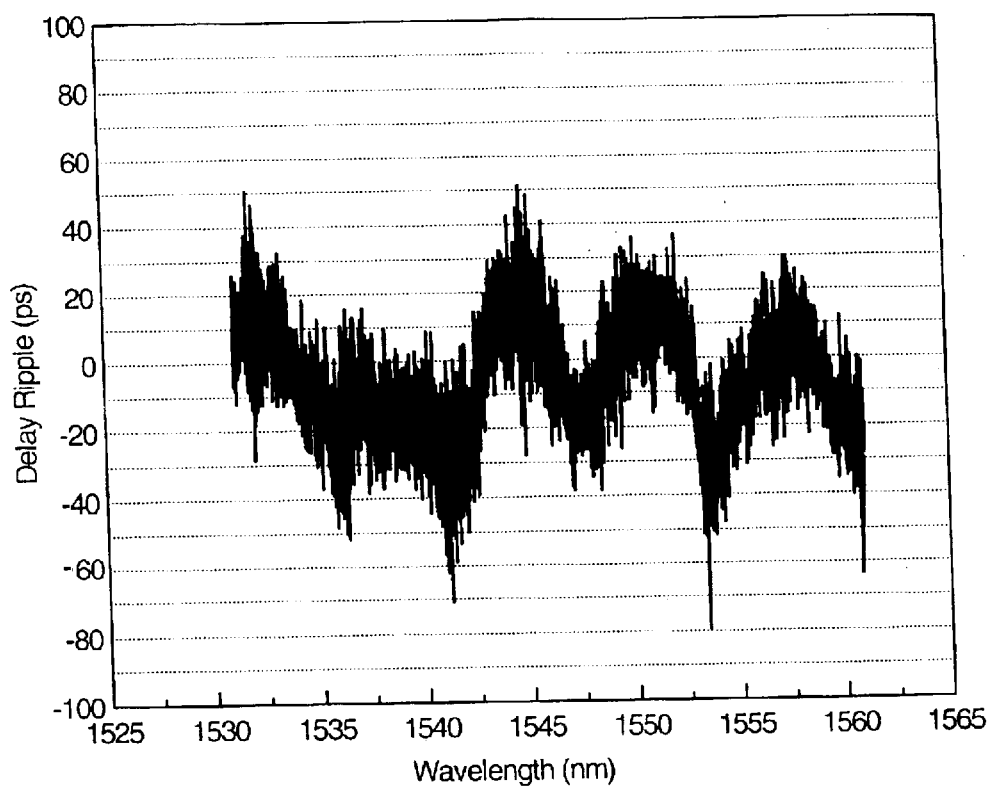
FIG. 13 is a graph that shows the delay ripple of a high quality chirped long length grating of ~30 nm bandwidth.

A wider bandwidth grating was fabricated with the FBG fabrication system described in Example 4. Spectra from an example wideband FBG of ~2 m length is shown in FIG. 11, where the reflectivity and delay of the device is shown. The gross insertion loss of this device is typically ~5 to 5.5 dB (including circulator loss), and the insertion loss variations is ~±1 dB. The insertion loss of the grating measured in transmission is >3 dB. The bandwidth of the shown device is >30 nm. After subtracting the linear dispersion of −629 ps/nm from the delay curve, the delay slope of −1.1 ps/nm$^2$ remains, as shown in FIG. 12. After fitting a quadratic polynomial to the dispersion slope curve shown in FIG. 12, the delay ripple remains, as shown in FIG. 13. These measurements were made with the modulation-phase shift method at a frequency of 200 MHz at a ~5 pm resolution. A swept tunable laser system, where the scan rate of the laser has been synchronized with the network analyzer, performed these measurements. Due to the nature of this measurement configuration, the delay ripple is effectively averaged over a bandwidth of ~5 pm. Note that the high frequency ripple of this device is less than ±25 ps across large bandwidth regions of the device, and is less than ±40 ps across the FWHM of the device.

Figure 14:
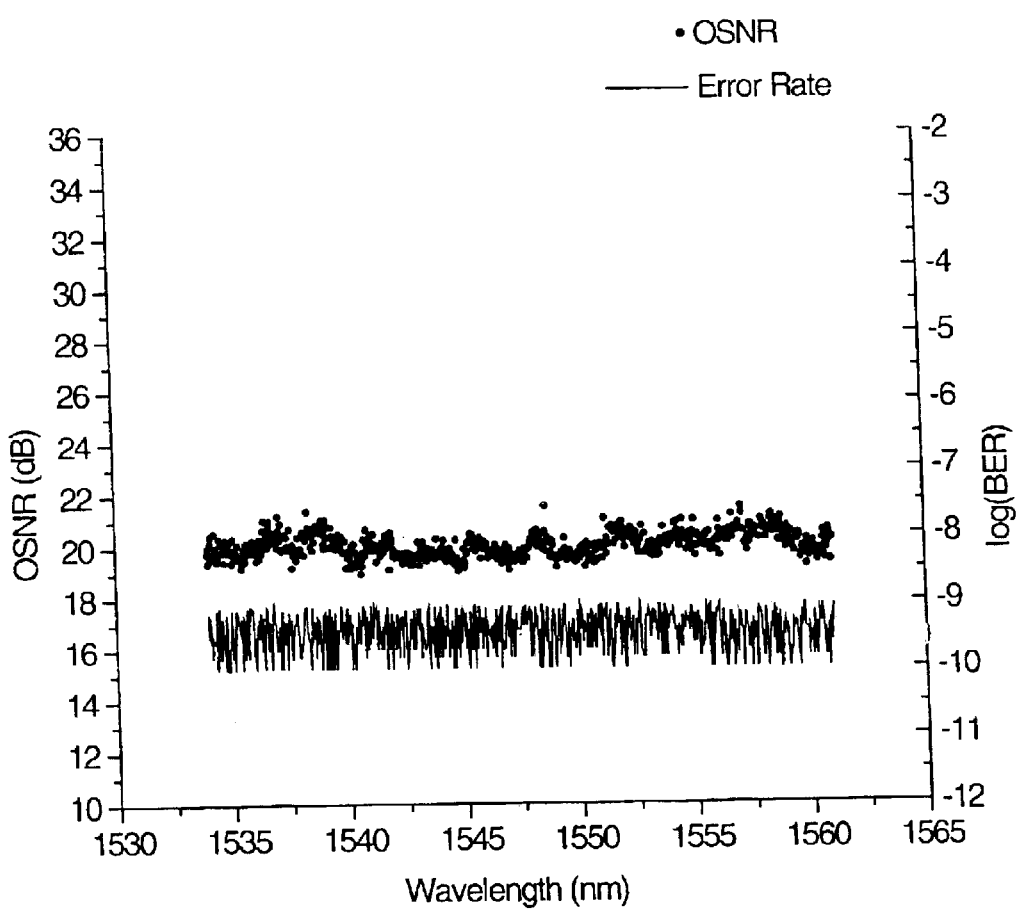
FIG. 14 is a graph that shows the optical signal to noise ratio needed to maintain the bit-error-rate between $10^{-9}$ and $10^{-10}$ across the DCG bandwidth.

The performance of this DCG was assessed in a system testbed, described in Example 4. The uniformity of the DCG performance in the system is examined by measuring the optical signal to noise ratio (OSNR) required to maintain a fixed bit-error-rate (BER) across the DCG bandwidth. Noise was added to the transmitted signal after dispersion compensation to vary the OSNR, and the BER was determined. As the system wavelength was varied across the DCG bandwidth in 25 pm steps, the noise amplitude was adjusted to keep the BER in the range from $10^{-9}$ to $10^{-10}$. Noise, generated by combining the ASE from two EDFAs, was added to the transmitted signal through an attenuator, and the OSNR, measured with an optical spectrum analyzer, was varied with the attenuator. FIG. 14 shows the OSNR needed to maintain the BER across the DCG bandwidth.

Those skilled in the art will appreciate that the present invention may be used in the manufacture of a variety of optical components. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. A device, comprising:
   a chirped Bragg grating, said grating having (a) a reflection bandwidth having a full-width at half maximum that is greater than 6 nm, and (b) a reflection delay ripple amplitude of less than ±50 ps, wherein said device has a peak insertion loss, measured in transmission, of greater than 0.1 dB.

2. The device of claim 1, wherein said device has a dispersion, measured in reflection, whose magnitude is greater than 100 ps/nm.

3. The device according to claim 1, wherein said device has a dispersion, measured in reflection, whose magnitude is greater than 400 ps/nm.

4. The device according to claim 1, wherein said device has a peak insertion loss, measured in transmission, of greater than 1 dB.

5. The device according to claim 1, wherein the device has a reflection bandwidth greater than 10 nm.

6. The device according to claim 1, wherein the device has a reflection bandwidth greater than 15 nm.

7. The device according to claim 1, wherein the device has a delay ripple amplitude A such that $|A|<30$ ps.

8. The device according to claim 7, wherein the device has a delay ripple amplitude A such that $|A|<30$ ps for at least 50% of the reflection bandwidth.

9. The device according to claim 1, wherein the bandwidth of the device is greater than 25 nm.

10. The device according to claim 1, wherein the device has a high-frequency delay ripple amplitude A such that $|A|<50$ ps.

11. The device according to claim 10, wherein the device has a high-frequency delay ripple amplitude A such that $|A|<30$ ps for at least 75% of the reflection bandwidth.

12. The device according to claim 1, wherein the device has a high-frequency delay ripple amplitude A such that $|A|<30$ ps.

13. The device according to claim wherein the device has a high-frequency delay ripple amplitude A such that $|A|<30$ ps for at least 50% of the reflection bandwidth.

14. An optical communications system that uses the device of claim 1.

15. An optical fiber for propagating light comprising
   a core;
   a cladding; and
   a chirped Bragg grating comprising
      refractive index perturbations formed within the waveguide, said grating having a bandwidth in reflection having a full-width at half maximum greater than 6 nm;
      a reflection delay ripple amplitude, determined by subtracting a sixth-order polynomial from the reflection delay curve measured by the modulation-phase shift method with a frequency of 200 MHz, less than ±50 ps;
      a dispersion, measured in reflection, of magnitude greater than 100 ps/nm; and
      a peak insertion loss, measured in transmission, greater than 1 dB.

16. An optical communications system that uses the optical fiber of claim 15.

17. An optical device, comprising:
   a waveguide equipped with a chirped Bragg grating, said gating comprising refractive index perturbations formed within the waveguide and having a bandwidth in reflection having a full-width at half maximum greater than 6 nm; and
   a reflection delay ripple amplitude which, when determined by subtracting a sixth-order polynomial from the reflection delay curve measured by the modulation-phase shift method using a frequency of 200 MHz, is less than k;
   wherein $|k|<50$ ps; and
   a peak insertion loss, measured in transmission, greater than 1 dB.

18. An optical communications system that uses the device of claim 17.

* * * * *

UNITED STATES PATENT AND TRADEMARK OFFICE
CERTIFICATE OF CORRECTION

PATENT NO. : 6,741,773 B2
DATED : May 25, 2004
INVENTOR(S) : Brennan James F. III It is certified that error appears in the above-identified patent and that said Letters Patent is hereby corrected as shown below:

Title page,
Item [75], Inventors, delete "Edward Hernadez" and insert -- Edward Hernandez -- therefor.
Item [22], PCT Filed, delete "January 3, 2003" and insert -- January 30, 2003 -- therefor.
Item [56], References Cited, OTHER PUBLICATIONS, "A. Asseh, et al." reference, should read as follows:
-- A. ASSEH, et al; "A Writing Technique for Long Fiber Bragg Gratings with Complex Reflectivity Profiles", *Journal of Lightwave Technology* (Aug. 1997); Vol. 15, No. 8; pp. 1419-1423 --.
"R. KASHYAP, et al." reference, delete "Grantings" and insert -- Gratings -- therefor.
"H. ROURKE, et al." reference, should read as follows:
-- H. ROURKE, et al; "Fabrication of Extremely Long Fibre Gratings by Phase Matched Concatenation of Multiple Short Sections", *Bragg Gratings, Photosensitivity, and Poling in Glass Waveguides*, Optical Society of America, Technical Digest (Sept. 23-25, 1999); pp. 32/ThD1-1 - 34/ThD1-3 --.
"KOMUKAI, T., et al." reference, after "Communications" insert -- , --.
"LOH, W.H., et al." reference, should read as follows:
-- LOH, W.H., et al, "Dispersion Compensation Over Distances in Excess of 500 km for 10-Gb/s Systems Using Chirped Fiber Gratings", *IEEE Photonics Technology Letters*, Vol.8, No.7, July 1996; pp. 944-946 --.
"GARRETT, L.D, et al." reference, should read as follows:
-- GARRETT, L.D., et al, "16x10 Gb/s WDM Transmission Over 840-km SMF Using Eleven Broad-Band Chirped Fiber Gratings", *IEEE Photonics Technology Letters*, Vol.11, No.4, April 1999; pp. 484-486 --.
"GNAUCK, A.H., et al." reference, delete "Grantings" and insert -- Gratings -- therefor.
"FUGII, K., et al." reference, delete "Confernce" and insert -- Conference -- therefor.
"GNAUCK, A.H., et al." reference, delete "Convertional" and insert -- Conventional -- therefor.
"ROCGA, Monica L., et al." reference, should read as follows:
-- ROCHA, Mônica L., et al., "System Impact of the Physical Length of Unapodised Chirped Fiber Bragg Gratings on Dispersion Compensation", *SBMO/IEEE MTT-S IMOC '99 Proceedings*, 1999 IEEE; pp. 565-569 --.
"GARRETT, L.D., et al." reference, delete "Cguroed Fuber" and insert -- Chirped Fiber -- therefor.
"IBSEN, Morton, et al." reference, should read as follows:
-- IBSEN, Morton, et at, "Long Continuously Chirped Fibre Bragg Gratings for Compensation of Linear- and 3rd Order-Dispersion", European Conference on Optical Communication, 1997 --.
"NIEMI, T., et al." reference, delete "Eletro-Opt." and insert -- Electro-Opt. -- therefor.

UNITED STATES PATENT AND TRADEMARK OFFICE
CERTIFICATE OF CORRECTION

PATENT NO.   : 6,741,773 B2
DATED        : May 25, 2004
INVENTOR(S)  : Brennan James F. III It is certified that error appears in the above-identified patent and that said Letters Patent is hereby corrected as shown below:

Column 6,
Line 48, delete "ouside" and insert -- outside -- therefor.

Column 7,
Line 24, delete "rotaional" and insert -- rotational -- therefor.
Line 24, delete "cm" and insert -- $cm^2$ --.

Column 8,
Line 63, delete "0-3-534330-5" and insert -- 0-13-534330-5 -- therefor.

Column 10,
Line 18, delete "<30" and insert -- <50 -- therefor.
Line 22, after "claim" insert -- 11 --.
Line 50, delete "gating" and insert -- grating -- therefor.

Signed and Sealed this

First Day of February, 2005

JON W. DUDAS
*Director of the United States Patent and Trademark Office*